Patented Aug. 4, 1931

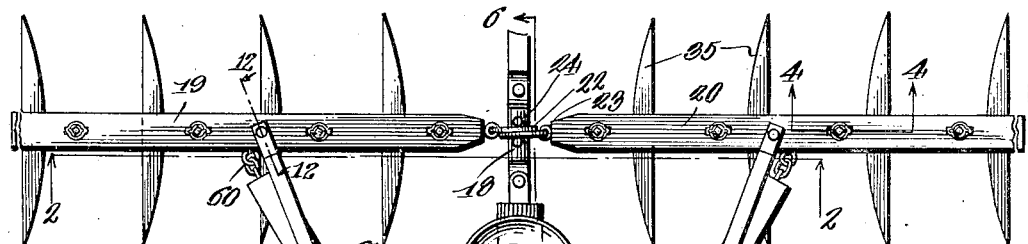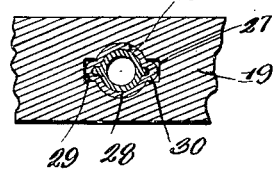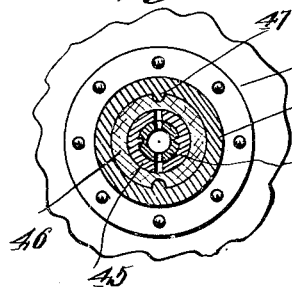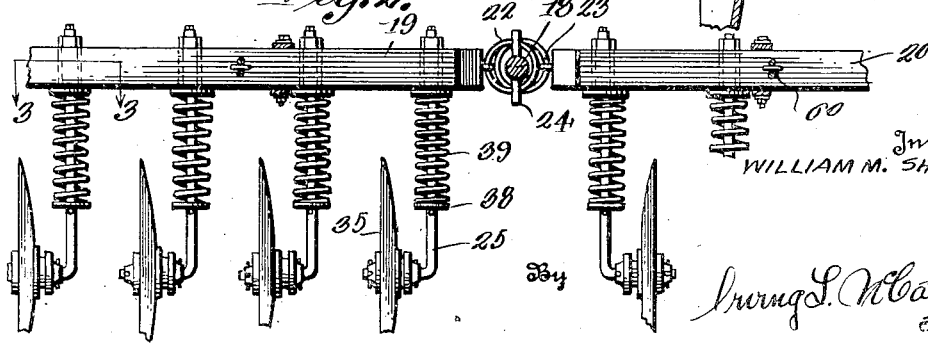

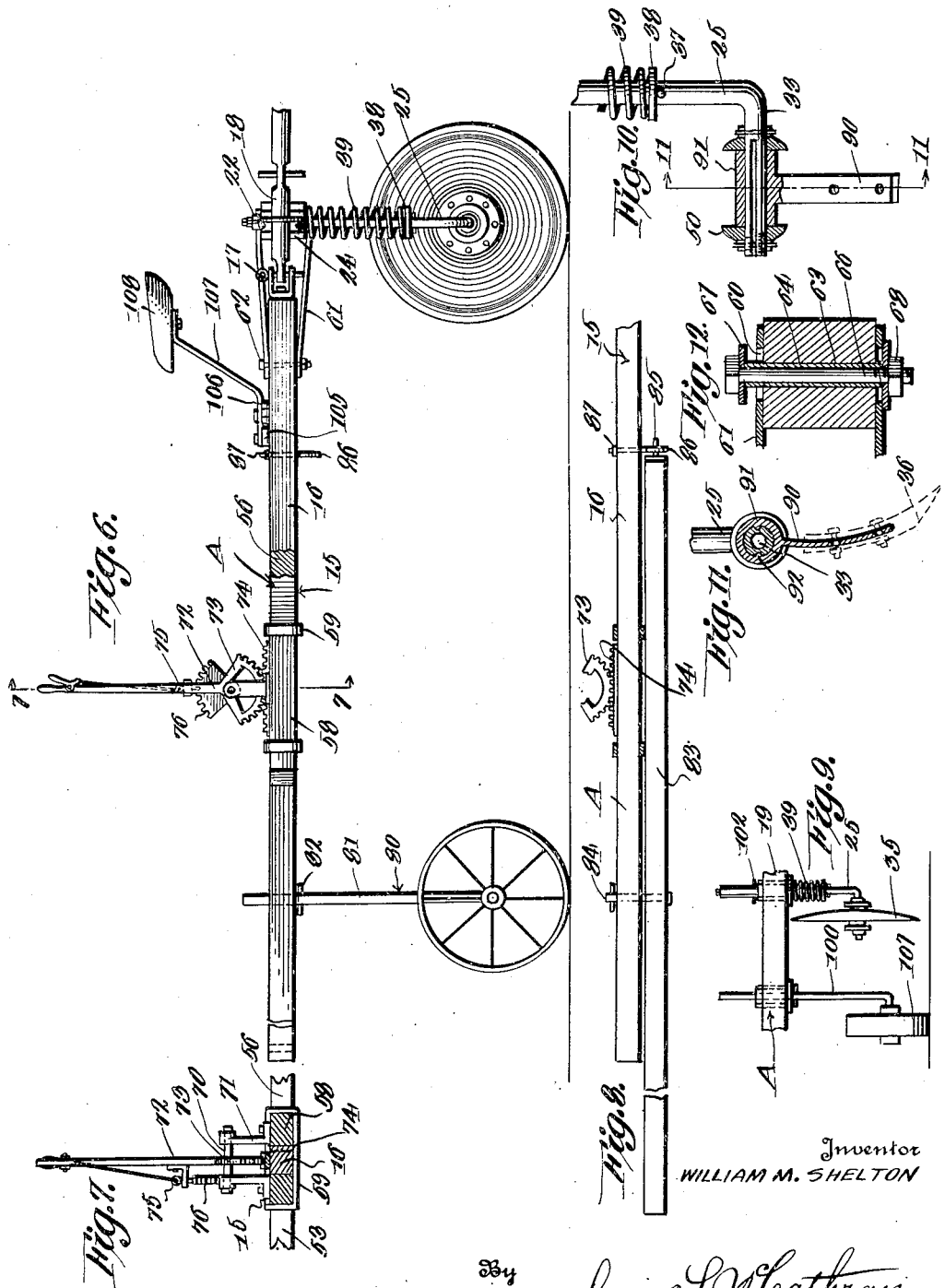

1,817,851

UNITED STATES PATENT OFFICE

WILLIAM M. SHELTON, OF ORCHID, VIRGINIA

SPRING TOOTH AND SPRING DISK HARROW

Application filed February 25, 1930. Serial No. 431,207.

This invention appertains to agricultural implements and more particularly to an improved harrow.

One of the primary objects of my invention is to provide a harrow having interchangeable spring teeth and spring harrow disks whereby the harrow can be used interchangeably as a tooth or disk harrow.

Another important object of my invention is to provide an improved harrow embodying novel harrow beams slidably receiving the implement bearing arms, the implements carried by the arms being normally urged into engagement with the ground independently of one another by resilent means carried by the arms and engaging the beams.

A further salient object of my invention is the provision of slidably mounting the arms in the beams against rotary movement therein, said means embodying a bearing sleeve fited within the beams for each arm and having longitudinally extending grooves for slidably receiving guide ribs on the arm which extend through the sleeve.

A further object of my invention is the provision of novel spindles formed directly on the arms for interchangeably receiving rotatable harrow disks and harrow teeth, each arm and spindle being formed in a novel maner to permit the effective lubrication of the bearing for the rotatable harrow disk.

A further object of my invention is the provision of means whereby the arms carrying the implements may be held in a raised position against the tension of their springs and above the ground whereby supporting wheels can be associated with the harrow beams for permitting the effective transporting of the harrow from the barn to the field or vice versa, or from one field to another.

A further object of my invention is the provision of novel means for connecting the harrow beams with the longitudinal frame beam whereby the harrow beams on opposite sides of the longitudinal frame beam are permitted to swing in a vertical plane independently of one another.

A further object of my invention is the provision of novel hounds slidably connected with the main frame beam and swivelly connected with the harrow beams, with means for adjusting the main frame beam relative to the hounds, whereby the angle of the harrow beams in a horizontal plane can be adjusted.

A still further object of my invention is to provide an improved harrow of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is a top plan view of my improved harrow.

Figure 2 is a transverse section through the same taken on the line 2—2 of Figure 1 looking in the direction of the arrows, illustrating the means of mounting the laterally extending harrow beams with the main longitudinally extending frame beam.

Figure 3 is a detail horizontal section taken on the line 3—3 of Figure 2 illustrating the means slidably connecting one of the implement arms with a harrow beam.

Figure 4 is a vertical section taken on the line 4—4 of Figure 1 looking in the direction of the arrows illustrating the means of mounting an implement carrying arm on the harrow beam and illustrating the construction of the arm and spindle and the bearing for the harrow disk.

Figure 5 is a detail vertical section taken through the bearing for the harrow disk on the line 5—5 of Figure 4 looking in the direction of the arrows.

Figure 6 is a side elevation of my improved harrow showing parts thereof broken away and in section.

Figure 7 is a vertical transverse section taken on the line 7—7 of Figure 6 looking in the direction of the arrows illustrating the means employed for adjusting the angle of the harrow beams in a horizontal plane.

Figure 8 is a fragmentary side elevation illustrating the means of connecting a tractor hitch with the main beam of the cultivator.

Figure 9 is a fragmentary front elevation of one of the harrow beams showing the implement carrying arms in their raised position and a supporting ground wheel connected with the beam.

Figure 10 is a fragmentary front elevation of one of the implement carrying arms showing the means of associating a harrow tooth therewith, parts of the figure being shown in section.

Figure 11 is a vertical section taken on the line 11—11 of Figure 10 looking in the direction of the arrows illustrating the means of associating a harrow tooth with the implement carrying arms.

Figure 12 is a detail section taken on the line 12—12 of Figure 1 illustrating the means of connecting the brace straps for the hounds of the main frame with the harrow beams.

Referring to the drawings in detail, wherein similar reference characters designate corresponding parts throughout the several views, the letter A generally indicates my improved harrow which comprises a main frame 15 having the longitudinallly extending main frame beam 16. The rear end of the main frame beam 16 has pivotally connected thereto by the use of a suitable clevis and pin 17 a tubular coupling pole 18, for a purpose which will be later described. Swivelly connected with the connecting pole 18 are the laterally extending harrow beams 19 and 20 the inner ends of which are provided with enlarged rings 22, the rings being connected with the beams 19 and 20 by means of eyes 23. The pole 18 is adapted to be placed through the rings 22 and suitable pins 24 can be placed through the poles on opposite sides of the rings for holding the same in place.

The harrow beams 19 and 20 carry the ground working implement and these beams are of a special character as well as the arms 25 which carry the implements. As clearly shown in Figures 1 and 2 of the drawing the implement beams 19 and 20 are provided at equi-distantly spaced points with vertically disposed openings 26 the walls of which at diametrically opposed points are provided with longitudinally extending grooves 27. Each opening 26 receives therein a metallic guide sleeve 28, which sleeve is provided with longitudinally extending diametrically disposed ribs 29 which are fitted within the grooves 27 of the openings. The inner faces of the ribs 29 are also provided with guide grooves for a purpose, which will now appear. The implement carrying arms 25 are slidably received within the metallic sleeves 28 and the arms adjacent to the upper ends thereof are provided with longitudinally extending diametrically disposed ribs 30, which are slidably received within the guide grooves formed in the ribs 29 of the bearing sleeve 28. By this arrangement, it can be seen that the bearing sleeves are prevented from turning in their openings 26 and that the implement carrying arms 25 are likewise prevented from turning movement in the sleeves but that the arms are free for sliding movement therein. If desired, suitable ball bearings can be provided for facilitating the sliding of the arms 25. In order to firmly hold the sleeves in place the lower ends thereof are provided with laterally extending ears or annular flanges 31 which can be connected to the lower face of the implement beam by means of screws or other fastening elements 32. The lower ends of the arms 25 are provided with laterally extending horizontally disposed spindles 33, the outer ends of which are threaded as at 34. These spindles are adapted to interchangeably receive harrow disks 35 or harrow teeth 36.

The arms 25 are normally urged downward from the implement or harrow beams 19 and 20 in order to independently urge the disks 35 or teeth 36, as the case may be, into engagement with the ground and thus each arm is provided with a diametrically extending pin 37, on which rests a washer 38 forming a seat for a relatively heavy expansion coil spring 39, which is placed about each arm. The upper ends of the spring 39 bear against the annular flanges 31 of the bearing sleeves 28 and thus it can be seen that each arm is independently urged toward the ground.

Referring more particularly to Figures 4 and 5 it is to be noted that I have provided a novel bearing for the harrow disks 35 and it can be seen that each disk has secured thereto the oppositely extending hub sleeves or boxes 40. The inner ends of the axle of the boxes or hub sleeves 40 are provided with annular flanges 41 which abut the opposite side faces of the disk and suitable rivets 42 or the like extend through the flanges and the disk. The disk is provided with an axial opening registering with the bores of the axle boxes or hub sleeves 41, as shown in Figure 4. The spindle 33 of each arm is preferably provided with longitudinally extending grooves 43 and a metallic bearing sleeve 45 having mating rib grooves is slid upon the spindle. This bearing sleeve in turn receives a woden anti-friction bearing sleeve 46 which is preferably carried by the hub sleeves 40, the hub sleeves being provided with longitudinally extending ribs 47 fitted in grooves formed in said wooden bearing sleeve 46. Prior to the placing of the metallic bearing sleeve 45 and the wooden bearing 46 in position on the spindles, an axle washer 48 can be slipped on the spindle and held in place by a suitable cross pin 49 which extends through the said spindle. The sleeves can now be placed in position as well as the harrow disk after which an outer axle washer 50 is threaded on the spindle in engagement with the hub sleeve, and the bearing sleeve 45 and 46 and the same can be held against rotation by the use of a suitable cross pin 51.

I form the arm 25 and spindle in a novel manner so as to insure the proper lubrication of this bearing and as shown the arm and spindle is of hollow formation and forms a reservoir for a suitable lubricating oil or grease. The upper end of the tubular arm 25 is closed by a removable plug 52 and the outer end of the spindle is closed by a removable plug 53. The spindle and the inner bearing sleeve 45 are provided with registering lubricating openings 54 and thus it is obvious that the grease or other lubricant can flow from the hollow spindle into said registering opening onto the rotatable wooden bearing sleeve 46.

Again referring to the main frame 15, it is to be noted that the same includes hounds 55 and 56 which include the rearwardly inclined body portions 57 and the forwardly spaced parallel portions 58 which lie on opposite sides of the main beam 16. These hounds 55 and 56 are slidably connected to the main beam by means of guide straps 59 which are riveted or otherwise secured directly to the hounds and which extend over the top and bottom of the main beam 16. The rear ends of the hounds 55 and 56 are swivelly connected to the harrow beams 19 and 20 by the use of interengaging eyes 60 carried respectively by the harrow beams 19 and 20 and the hounds 55 and 56.

In order to brace the beams 19 and 20 and still permit slight independent swinging movement thereof, I provide upper and lower brace straps 61 for each beam and the forward ends of the upper and lower brace straps 61 are connected to the upper and lower faces of the hounds 55 and 56 by means of suitable bolts or the like 62.

In order to hold the main beam 16 in a raised position and to relieve the weight thereof from off the draft animals the same can be provided with a tongue truck 80, the post 81 of which can extend through the beam 16. A cross pin 82 can extend through the post of the tongue truck and engage the under side of the main beam 16. By this arrangement the removal of the truck from the main beam is permitted.

It is obvious that the harrow can be drawn across the field by a tractor instead of draft animals and in such instance the tongue truck 80 can be removed and the beam 16 connected directly with the harrow. If preferred, the tongue truck 80 can be also eliminated when the device is being used with draft animals and in such instance a hitch team 83 is utilized, as shown in Figure 8 of the drawing.

The beam 83 can extend longitudinally of and forwardly of the front end of the main beam 16 and can be connected thereto by means of a removable key 84 which can extend through the hitch beam 83 and harrow main beam 16. The rear end of the hitch beam 83 can be provided with a pin 85 which can extend through an eye 86 formed in the lower end of the bolt 87 carried by and extending through the said main beam 16.

As heretofore intimated, one of the main objects of my invention is the provision of a harrow in which harrow teeth can be substituted for the harrow disks and in Figures 10 and 11 I have illustrated the means for associating the harrow teeth with the implement arms. When the harrow teeth 36 are to be used the harrow disks 35 and the bearing sleeves 45 and 46 are removed and I use in lieu thereof a foot 90 to which the harrow tooth can be bolted. The upper end of the foot carries a sleeve 91 having longitudinally extending ribs 92 for fitting in the grooves formed in the spindle 33 of the implement carrying arm 25. The sleeve 91 can be held in place by the outer washer 50 as shown.

The rear ends of the straps 61 are connected to the upper and lower faces of the beams 19 and 20 in a novel manner as will now be described to permit rocking movement of the said beams independently of one another. As shown, each harrow beam preferably in between a pair of the implement carrying arms is provided with an opening 63 through which extends a sleeve 64, the terminals of which extend a suitable distance beyond the upper and lower faces of the beams. The rear ends of the straps 61 are provided with enlarged openings 65 which receive the ends of the sleeve 64. A bolt 66 is now passed through the sleeve and relatively large washers 67 are placed between the head of the bolt and the adjacent end of the sleeve 64 and between the holding nut 68 of the bolt and the sleeve 64. This effectively holds the braces in place but still allows rocking and turning movement of the braces on the said bolt.

In order to permit angular adjustment of the beams 19 and 20 in a horizontal plane, I provide novel means for sliding the main beam 16 relative to the hounds 55 and 56. This means embodies the rock shaft 17 mounted in suitable bearings 71 carried directly by the said hounds. Rockable with the shaft 70 is an operating lever 72 having formed on its lower end an arcuate toothed rack 72 which meshes with a rack bar 74 rigidly connected with the beam 16. Thus by swinging the lever the beam and the hounds can be slid relative to one another which will effectively swing the harrow beams 19 and 20 on the pole 18. In order to hold the lever 72 in its preferred adjusted position the same is provided with a hand grip operated pawl 75 which is adapted to selectively engage the teeth of a sector rack 76 which is rigidly connected with one bearing 71.

When the harrow is being moved from one field to another or from a barn to the field, the end or an intermediate implement carrying arm 25 of each harrow beam can be removed and a post 100 is substituted therefor carrying a ground wheel 101. This is clearly shown in Figure 9 of the drawings. The arms 25 can be drawn up to a raised position against the tension of their coil springs 39 and held in their raised position by means of pins 102 placed through openings 103 in said arms, the pins resting against the upper surface of the bearing sleeves 28.

I prefer to have the harrow of the riding type and thus the hounds 55 and 56 carry inwardly directed leaf springs 105 and 106 to which an intermediate portion thereof is pivoted the seat spring 107 which in turn carry the seat 108.

Changes in details may be made without departing from the spirit or the scope of this invention, but what I claim as new is:

1. A harrow comprising a main beam, a clevis carried by the rear end of the beam, a tubular pole detachably connected with the clevis, laterally extending harrow beams swivelly mounted on the pole, bracing means interposed between said harrow beams and said main beam and implement carrying arms connected with the harrow beam.

2. A harrow comprising a main beam, a clevis carried by the rear end of the beam, a tubular pole detachably connected with the clevis, laterally extending harrow beams swivelly mounted on the pole, implement carrying arms connected with the harrow beam, said implement arms being independently movable, and bracing means for holding said harrow beams in a set position relative to said main beam.

3. A harrow comprising a main beam, a clevis carried by the rear end of the beam, a tubular pole detachably connected with the clevis, laterally extending harrow beams swivelly mounted on the pole, bracing means carried by said main beam and engaging said harrow beams, implement carrying arms connected with the harrow beams, said implement arms being independently movable, and resilient means normally urging the arms to the lowered position.

4. A harrow comprising a main beam, a tubular pole connected with the rear end of the beam, laterally extending harrow beams, enlarged rings carried by the inner ends of said harrow beams and fitted over the pole, means for bracing said harrow beams relative to said main beam, means for limiting the rearward and forward movement of the rings on the pole, and implement carrying arms connected with the harrow beam.

5. A harrow comprising a main beam, a tubular pole carried by the rear end of the main beam, laterally extending harrow beams, means for bracing said harrow beams relative to said main beam, eyes carried by the inner ends of said harrow beams, enlarged rings carried by the eyes and fitted over the pole and removable pins carried by the pole and engaging the opposite faces of the rings.

6. A harrow comprising a longitudinally extending main beam, laterally extending harrow beams, means pivotally connecting the inner ends of the harrow beam to the main beam, means for bracing said harrow beams relative to said main beam, rearwardly directed hounds slidably associated with the main beam, means pivotally connecting the inner ends of the hounds to the harrow beams intermediate the length of said harrow beams, and means for shifting the main beam and the hounds relative to one another.

7. A harrow comprising a longitudinally extending main beam, laterally extending harrow beams, means pivotally connecting the inner ends of the harrow beam to the main beam, rearwardly directed hounds slidably associated with the main beam, means pivotally connecting the inner ends of the hounds to the harrow beams, intermediate the length of said harrow beams, means for shifting the main beam and the hounds relative to one another, and a seat carried by said hounds disposed over the main beam.

8. A harrow comprising a main longitudinally extending beam, laterally extending harrow beams, means pivotally connecting the inner ends of the harrow beams to the main beam, laterally and rearwardly extending hounds slidably associated with the main beam, interengaging eyes connecting the rear ends of the hounds to the harrow beams intermediate their ends, means for shifting the main beam and hounds relative to one another, and brace straps connecting the hounds with the harrow beams.

9. A harrow comprising a main longitudinally extending beam, laterally extending harrow beams, means for pivotally connecting the inner ends of the harrow beams to the main beam, laterally and rearwardly extending hounds slidably associated with the main beam, interengaging eyes connecting the rear ends of the hounds to the harrow beams intermediate their ends, means for shifting the main beam and hounds relative to one another, brace straps connecting the hounds with the harrow beams, said straps being arranged in pairs and having their forward ends connected with the upper and lower faces of the hounds, a sleeve extending through the harrow beams and projecting beyond the upper and lower faces thereof, the rear ends of each brace strap being provided with enlarged openings for receiving the projecting ends of the sleeve, and a bolt extending through the sleeve holding the rear ends of the straps in place thereon.

10. In a harrow, a harrow beam having a plurality of equi-distantly spaced openings, the walls of the openings being provided with longitudinal grooves, a bearing sleeve having ribs fitted in the grooves and received in said openings, means rigidly securing the sleeve in place, the inner faces of the sleeve being provided with longitudinally extending grooves, and implement carrying arms slidable in the sleeve and provided with ribs fitted into said last mentioned groove, a laterally extending spindle formed on the lower end of the arm, an implement detachably associated with said spindle.

11. In a harrow, a harrow beam having a plurality of equi-distantly spaced openings, the walls of the openings being provided with longitudinal grooves, a bearing sleeve having ribs fitted in the grooves and received in said openings, means rigidly securing the sleeve in place, the inner faces of the sleeve being provided with longitudinally extending grooves, and implement carrying arms slidable in the sleeve and provided with ribs fitted into said last mentioned groove, a laterally extending spindle formed on the lower end of the arm, an implement detachably associated with said spindle, a washer on said arm, means for limiting the downward movement of the washer, and an expansion coil spring arranged around the arm and resting on said washer and against the lower face of the beam.

12. In a harrow, a harrow beam having a plurality of equi-distantly spaced openings, the walls of the openings being provided with longitudinal grooves, a bearing sleeve having ribs fitted in the grooves and received in said openings, means rigidly securing the sleeve in place, the inner faces of the sleeve being provided with longtiudinally extending grooves, implement carrying arms slidable in the sleeve and provided with ribs fitted into said last mentioned groove, a laterally extending spindle formed on the lower end of the arm, an implement detachably associated with said spindle, a washer on said arm, means for limiting the downward movement of the washer, an expansion coil spring arranged around the arm and resting on said washer and against the lower face of the beam, said arm and spindle being formed hollow for the reception of a lubricant, the spindle being provided with outlets communicating with the interior of the spindle, and a removable plug closing the outer ends of the arms and spindle.

13. A harrow comprising a main beam, laterally extending harrow beams, independently slidable implement carrying arms carried by the harrow beams, spring means normally holding the arms in a lowered position, removable means for holding the arms in a raised position against the tension of their springs, and removable ground engaging wheels associated with said harrow beams.

In testimony whereof I affix my signature.

WILLIAM M. SHELTON.